(12) United States Patent
Jackson

(10) Patent No.: US 6,772,785 B2
(45) Date of Patent: Aug. 10, 2004

(54) DEMAND VALVE FOR BREATHING APPARATUS

(75) Inventor: Peter J. Jackson, Findon (GB)

(73) Assignee: International Safety Instruments, Inc., Lawrenceville, GA (US)

( * ) Notice: Subject to any disclaimer, the term of this patent is extended or adjusted under 35 U.S.C. 154(b) by 153 days.

(21) Appl. No.: 10/045,891

(22) Filed: Jan. 9, 2002

(65) Prior Publication Data

US 2003/0034071 A1 Feb. 20, 2003

(30) Foreign Application Priority Data

Aug. 15, 2001 (GB) .............................................. 0119922

(51) Int. Cl.⁷ .............................................. F16K 31/12
(52) U.S. Cl. .................... 137/489; 137/491; 137/492.5; 128/205.24
(58) Field of Search ................................ 137/489, 491, 137/492, 492.5; 128/205.24, 205.25

(56) References Cited

U.S. PATENT DOCUMENTS 5,520,170 A * 5/1996 Laswick et al. ....... 128/205.24
6,016,802 A * 1/2000 Jackson .................. 128/205.24

FOREIGN PATENT DOCUMENTS

| GB | 2174304 | 11/1986 |
|----|---------|---------|
| GB | 2190001 | 11/1987 |
| GB | 2195900 | 4/1988 |
| GB | 2239328 | 6/1991 |
| GB | 2269323 | 2/1994 |
| GB | 2274595 | 8/1994 |

\* cited by examiner

*Primary Examiner*—Kevin Lee
(74) *Attorney, Agent, or Firm*—Walter A. Rodgers

(57) ABSTRACT

There is described a demand valve for a breathing apparatus wherein a pilot jet of the demand valve is controlled by a pivoting lever resiliently held against a planar face in which the pilot jet is formed. The pilot jet is preferably formed in a land surface surrounded by a recessed area of the planar face, and opening of the pilot jet is effected by movement of a control projection mounted on the pivoting lever. The area of the control projection is preferably greater than the area of the land surface. A bypass arrangement for a demand valve is also disclosed

9 Claims, 6 Drawing Sheets

DEMAND VALVE FOR BREATHING APPARATUS

BACKGROUND OF THE INVENTION

This invention relates to demand valves for breathing apparatus whereby breathable gas stored under pressure is supplied to a face-piece, hood or helmet at a rate according to the respiratory requirements of the wearer, whilst at the same time maintaining a predetermined pressure within the face-piece, hood or helmet. The predetermined pressure is set either as super-ambient, or positive, so as to prevent any inward leakage of ambient atmosphere, or may be set as a negative pressure so that gas is only supplied when the wearer inhales.

Positive pressure demand valves for breathing apparatus are well known and employ a variety of mechanisms to control the flow of gas to the wearer according to his requirements, such mechanisms being actuated by movement of a pressure responsive diaphragm exposed on one side to ambient pressure and on the other side to pressure within the face-piece such that, when the wearer inhales, causing a drop in pressure within the face-piece, the diaphragm moves inwards, actuating the valve mechanism to admit gas to the face-piece at a rate proportional to the pressure drop. When inhalation ceases, equilibrium is restored and the valve closes. In order to maintain a small positive pressure within the face-piece, the valve is biased open, typically by means of a spring bearing against the outer face of the diaphragm such that a pressure of, say, 2 millibar within the face-piece is required to move the diaphragm outwards against the spring and thus close the valve. The wearer's exhaled breath is vented from the face-piece to the surrounding atmosphere through a simple non-return valve which is biased closed with a spring so as to only open when pressure within the face-piece exceeds ambient pressure by, say, 4 millibar. Thus it may be seen that pressure within the face-piece is continuously maintained at a level of between, say, 2 and 4 millibar above that of the surrounding atmosphere and by this means, any leakage due to damage or imperfect sealing of the face-piece, can only be outwards, so preventing any ingress of ambient atmosphere to the face-piece.

SUMMARY OF THE INVENTION

For many applications, it is required to provide the demand valve with a manually operated bypass valve in order to supply a controlled continuous flow of breathable gas to the wearer independently of the normal demand operation.

An objective of the present invention is to provide a demand valve of simplified construction and assembly, wherein accurate positioning of moving parts is achieved with the minimum number of components.

A further objective of the present invention is to provide a two-stage demand valve whose performance is reliable and predictable, but which requires a minimum of precision-made components A further objective of the present invention is to provide a manual bypass arrangement for use in demand valves, incorporating a simplified construction with a minimum number of components, which provides to a wearer of the demand valve the possibility of a continuous flow of breathable gas to the facepiece.

One aspect of the present invention provides a pilot operated demand valve which is efficient, reliable and predictable in operation and is of small physical size and simple construction. A second aspect of the invention provides a bypass arrangement for a demand valve.

BRIEF DESCRIPTION OF THE SEVERAL VIEWS OF THE DRAWINGS

Embodiments of the invention will now be described in detail with reference to the accompanying drawings, in which.

DETAILED DESCRIPTION OF THE INVENTION

Figure 1:
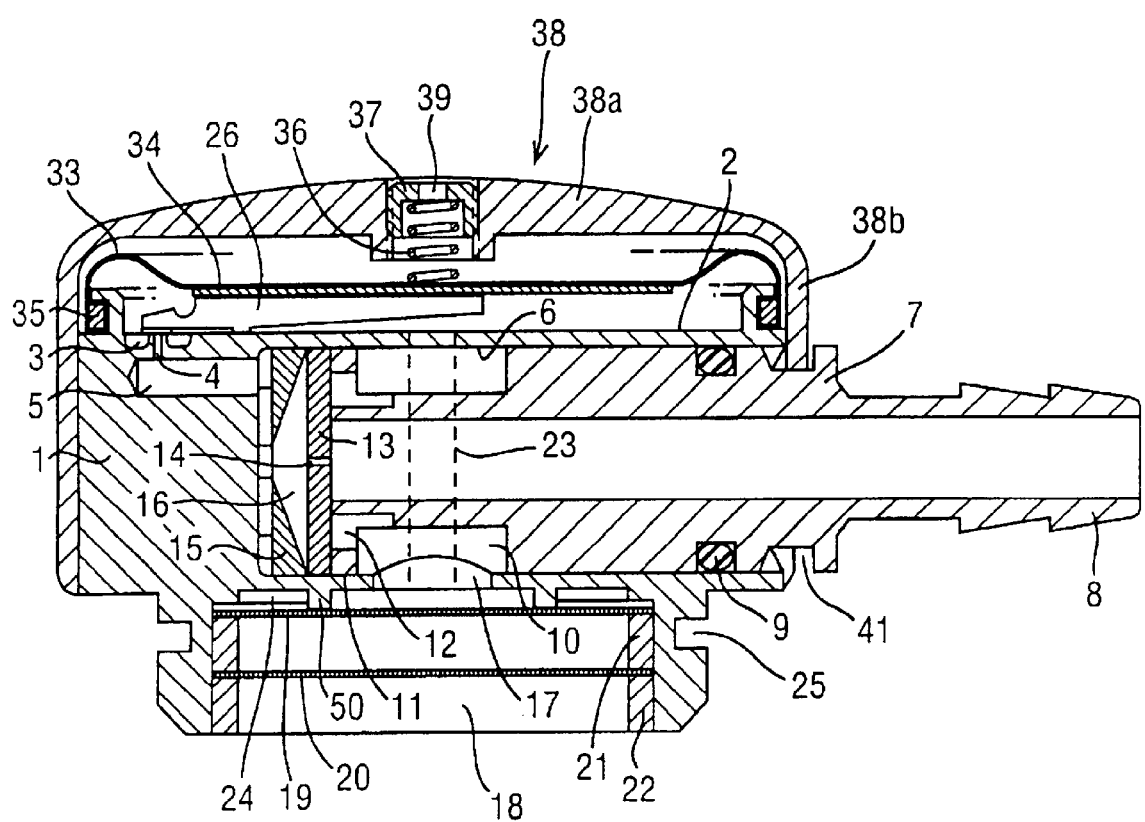
FIG. 1 shows a sectional elevation of the valve in its closed condition.

Referring now to the figures, the valve comprises a circular, generally disc-like body 1 having a radially extending inlet bore 6 and an axially extending outlet port 17 opening to one face of the disc-like body 1 and communicating with the inlet bore 6. The outlet port 17 opens into a recess 18 divided by an annular rib 50 into a central part 51 and an annular surrounding part 24. The outlet port 17 is surrounded by the annular rib 50.

Extending parallel to, and in communication with, the inlet bore 6 is a pilot bore 5. A pilot jet 4 extends from the pilot bore 5 to the other face 2 of the disc-like body 1. The face 2 of the body is made flat, and is formed with an annular recess 3 surrounding the jet 4, the end face of the jet 4 being set level with face 2.

Extending into the inlet bore 6, to its radially inner end, is a tubular inlet stem 7 which is rotatable within the bore 6 and which is formed at its radially outer end with a barbed stem 8 serving as a connection means for a supply hose (not shown). An annular seal 9 is housed in a groove around the inlet stem 7 to seal the stem 7 against the wall of the inlet bore 6 adjacent the radially outer end of the inlet bore 6. Close to the radially inner end of the stem 7, the stem 7 has an area of reduced diameter 10, which forms an annular chamber with the inlet bore 6 and defines a flange 11 at the end of the stem. Extending through the flange 11 in the axial direction of the stem are a number of openings 12 which provide fluid communication between the end face of the inlet stem 7 and the annular chamber area.

Adjacent to the end face of the inlet stem 7 there is a resilient valve disc 13, the periphery of which seals against the wall of the inlet bore 6. The centre of the valve disc is penetrated by a small metering orifice 14. The area of the valve disc between the metering orifice 14 and the periphery of the disc seals the openings 12 in the flange 11 of the inlet stem 7.

Figure 2:
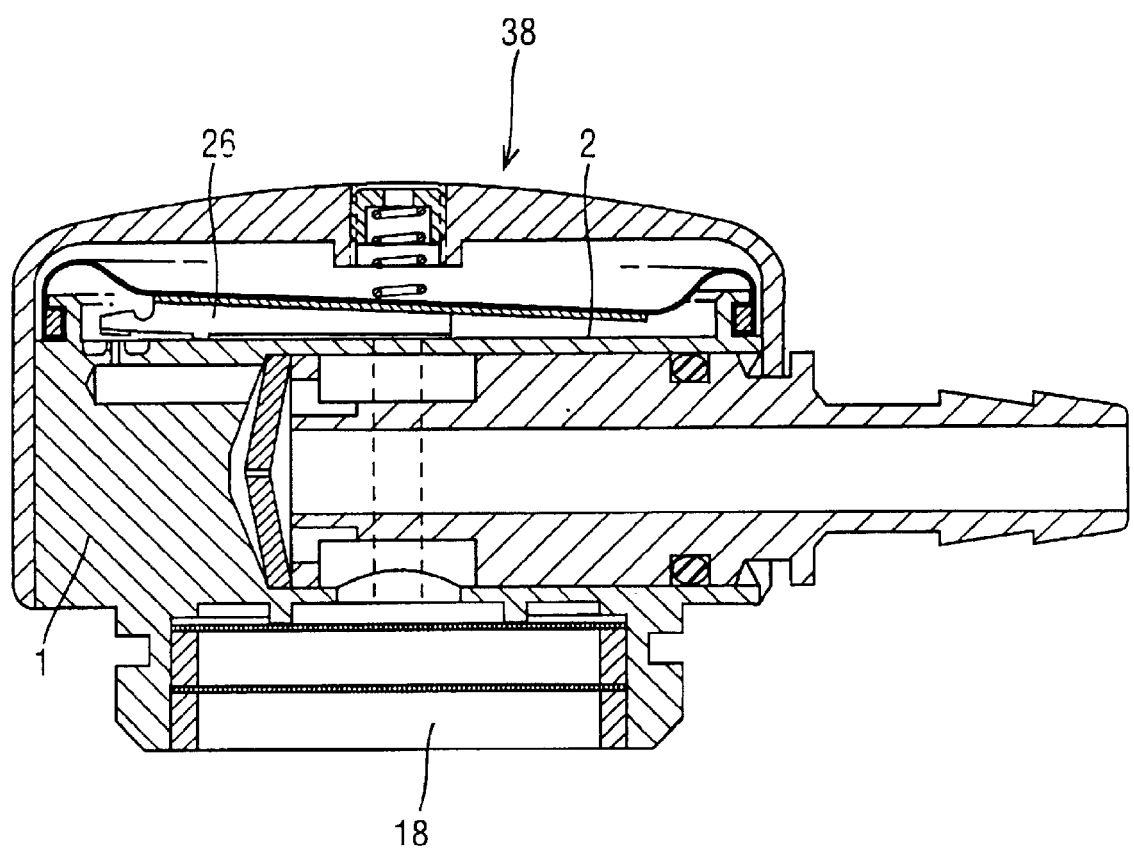
FIG. 2 shows a sectional elevation of the valve in its open condition.
Figure 3:
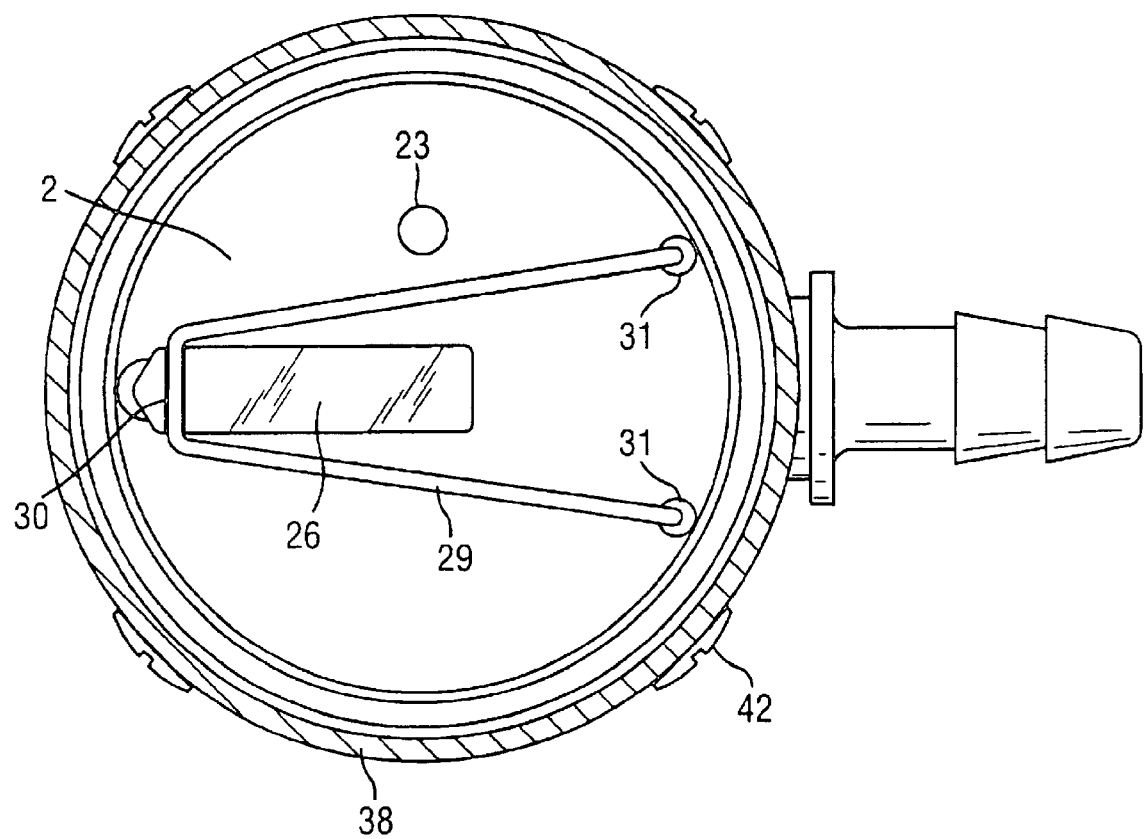
FIG. 3 shows a plan view of the valve showing an operating lever and its retaining wire form.
Figure 4A:
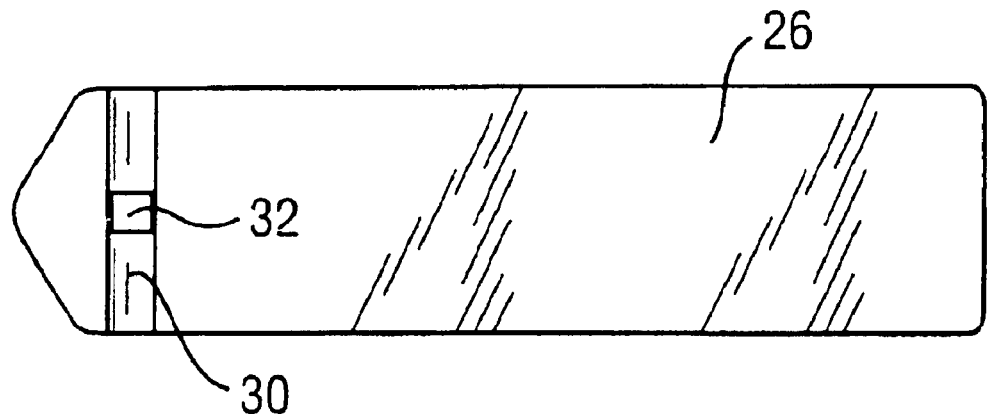
FIGS. 4a, 4b and 4c show top, side and underneath views of the lever respectively.
Figure 4B:
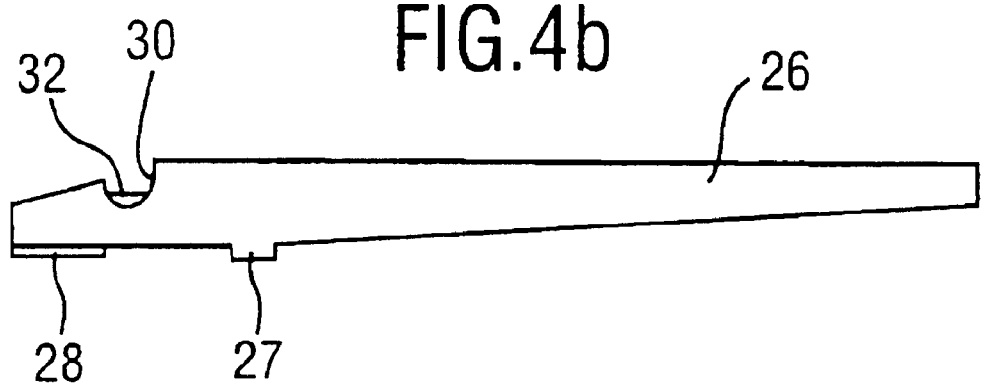
Figure 4C:
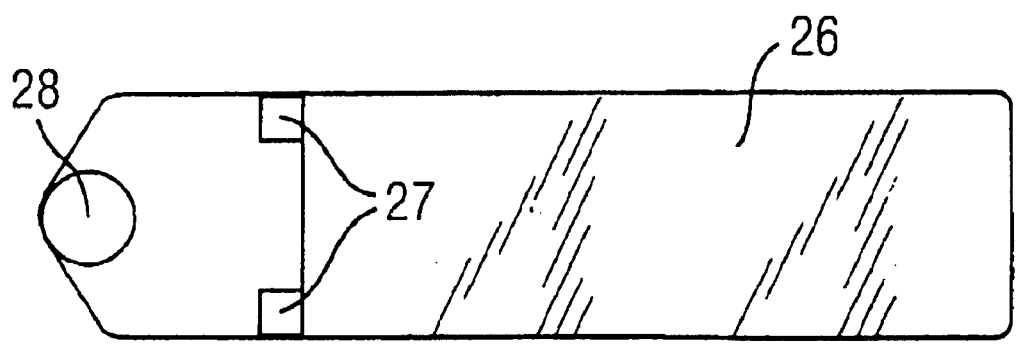

Between the valve disc and the radially inner end face of the inlet bore 6, there may be interposed a dished supporting disc 15, concave towards the stem 7, which forms a conical or domed chamber 16 between the valve disc 13 and the end face of the inlet bore 6. This chamber is in communication with the pilot bore 5 and the jet 4, by means of channels in the supporting disc 15. Alternatively, the end of the inlet bore 6 may be made concave so as to form the domed chamber 16, as is shown in FIG. 2.

The outlet port 17 in the body communicates between the annular chamber 10 and a recess 18 which houses a pair of wire screens 19 and 20, which are spaced apart and secured within the recess 18 by means of tightly fitting rings 21 and 22. The screen 19 rests against the end of the annular rib 50, while the screen 20 is spaced from the screen 19 by the ring 21. The rib 50 prevents direct fluid communication between the outlet port 17 and the annular space 24 between the screen 19 and the body 1 outside the annular rib 50. One end of a passage 23 extending through the body opens into this annular space 24 between the first screen 19 and the body 1, and the other end of the passage 23 opens on the face 2 of the body 1. The valve body 1 is adapted, by means of a groove 25 or by other suitable attachment means surrounding the recess 18, such as a screw thread or a bayonet fitting, to connect in a leak tight manner to a corresponding attachment means on a face-piece of a breathing apparatus or to a hood.

A lever 26 is arranged to extend radially across the face 2 of the valve body 1. The lever 26 has two projections 27 intermediate the length of the lever which engage face 2 of the body 1, and a control projection 28 which is positioned at a first end of the lever over the jet 4, and has a flat face to contact the face 2 of the body 1. A second end of the lever is positioned substantially centrally with relation to the body 1, and is spaced from the flat face 2 of the body 1.

The lever 26 is held in this position by means of a generally U-shaped spring wire form 29, whose central section is located in a transverse groove 30 extending across the lever between the projections 27 and the control projection 28. The "legs" of the U-shape extend longitudinally of the lever, with the ends of the spring wire form secured in holes 31 formed in the face 2 of the body. The spring wire form 29 exerts a force on the lever urging it in the direction of the face 2. A ridge or embossment 32 positioned centrally in the groove in the lever and upon which the wire form bears, ensures that the force applied by the wire form is substantially evenly applied to the two projections 27 upon which the lever stands, even if that part of the wire form which passes through the groove is not parallel to surface 2.

The groove 30 in the lever is preferably positioned nearer to the control projection 28 than to the projections 27, so that the force of the spring wire 29 is mainly applied to the control projection 28. In the most preferred position, the groove 30 is spaced twice as far from the projections 27 as it is from the control projection 28. The groove must be positioned so that the force exerted on the projection 28 by the wire form 29 can overcome the supply pressure of gas at the jet 4.

The lever 26 is so shaped that it can be tilted to a limited degree by moving the second end of the lever towards the face 2 of the body, rocking the lever about an axis defined by the engagement of the two projections 27 with face 2. When the lever 26 is so tilted, the control projection 28 will move away from the jet 4.

The lever 26 is positioned between the face 2 of the body 1 and a flexible diaphragm 33, having a rigid central plate 34 and a peripheral bead 35 shaped to fit into and seal against the faces of a groove formed in an upstanding rim projecting from the face 2. The diaphragm 33 and the face 2 define a variable volume into which the jet 4 and the passage 23 open.

The diaphragm 33 is held in contact with the second end of the lever 26 by means of a biasing spring 36, one end of which is in contact with the face of the diaphragm 33 remote from the body 1, and the other end of which is retained in a recess in an adjusting screw 37 threaded into a central boss in a rigid cover 38 attached to the body 1 and covering the diaphragm 33. A small hole 39 in the adjusting screw 37 admits ambient pressure to the outer face of the diaphragm 33. In an alternative embodiment (not shown) a vent hole may be formed in the cover 38 to provide fluid communication between the ambient atmosphere and the face of the diaphragm 33 remote from the body 1.

In a positive-pressure demand valve, arranged to prevent any inward leakage of ambient atmosphere into the facepiece, the pressure exerted on the diaphragm 33 by the adjusting spring 36 is adjusted so that, in the absence of a pressurised gas supply to the demand valve, the second end of lever 26 is held in contact with face 2 of the valve body, and the jet 4 is open.

The cover 38 has a substantially circular central portion to cover the diaphragm 33, and a depending peripheral flange to engage the periphery of the body 1. The peripheral flange has an arched cut-out 40 which engages with a groove or step 41 around the inlet stem 7 so as to prevent the inlet stem 7 from moving out of the inlet bore 6 of the body 1, and to allow the stem 7 to rotate. The cover 28 is secured to the body 1 by screws 42 extending through the flange. Alternative fixing means may be used, however.

In operation, a breathable gas is supplied to the demand valve from a supply hose at a pressure of about 10 bar, and passes through the central bore in the tubular inlet stem 7. The pressure of the gas deforms the resilient valve disc 13 into a domed shape, moving the valve disc away from the end face of the inlet stem 7 and allowing gas to pass through the openings 12 in flange 11 to the annular chamber 10, from which it passes through port 17 to the recess 18 and hence to the face-piece.

At the same time, a small continuous flow of gas passes through the metering orifice 14 in the valve disc 13 into the domed chamber 16 behind the disc, from whence it can escape through the bore 5 and the jet 4, while the lever 26 is held in a tilted position by the biasing spring 36 bearing against the diaphragm 33, such that the control projection 28 on the lever is held away from the jet 4. The small flow of gas from the jet 4 escapes freely from the space under the diaphragm through passage 23 to the annular space 24 and thence through the screens 19 and 20.

When the facepiece is sealed to the face of a wearer, the flow of gas from the valve outlet inflates the facepiece, causing the pressure within the face-piece to rise. Escape of gas from within the facepiece is controlled by a spring loaded exhalation valve. The pressure increase is communicated via passage 23 to the space between the diaphragm 33 and the face 2. The pressure acts upon the diaphragm 33, urging it away from the body 1 against the force of the biasing spring 36. This allows the lever 26 to be moved under the influence of the spring wire form 29 to bring the control projection 28 into contact with the face 2, closing the jet 4.

When the jet 4 is obstructed by the control projection 28 of the lever 26, the egress of gas through the jet 4 from the domed chamber 16 is interrupted, and the pressure in the domed chamber 16 rises to equal the pressure of the supplied gas, due to the continuous inflow of gas to the domed chamber through the metering orifice 14 in the resilient valve disc 13. The increased pressure in the domed chamber 16 urges the resilient valve disc 13 against the flange 11 on the inlet stem 7, thus closing the openings 12 in the flange and preventing further flow of gas to the outlet 10. The flow of gas is prevented for as long as the pressure in the facepiece and under the diaphragm 33 is sufficient to overcome the force of the spring 36.

An increase in pressure in the facepiece, such as when the wearer exhales, increases the pressure under the diaphragm 33, and keeps the jet 4 closed. The facepiece is provided with an exhalation valve which opens when the pressure within the facepiece is at a predetermined level above the ambient pressure, to release used gas. The exhalation valve is preferably arranged to open only when the pressure within the facepiece is sufficient to close the jet 4 of the demand valve.

A subsequent reduction in pressure within the face-piece, such as when the wearer inhales, will cause the diaphragm 33 to move towards the body 1 under the influence of the biasing spring 36, thus tilting the lever to move the control projection 28 away from the jet 4. Gas can then escape from the domed chamber 16 through the jet 4, and the pressure in the domed chamber falls such that the valve disc will be urged away from the face of flange 11 by the pressure of the incoming gas, allowing a flow of gas through the openings 12 to the outlet and hence to the face-piece.

In a negative-pressure demand valve, arranged to admit gas only when the wearer inhales, the pressure exerted on the diaphragm 33 by the adjusting spring 36 is so set that, in the absence of a pressurized gas supply, the second end of lever 26 is held away from face 2 of the valve body by the wire form 29 and the jet 4 is closed.

In operation of the negative-pressure demand valve, a breathable gas is supplied to the demand valve from a supply hose at a pressure of about 10 bar, and passes through the central bore in the tubular inlet stem 7.

Since the jet 4 is obstructed by the control projection 28 of the lever 26, the egress of gas through the jet 4 from the domed chamber 16 is prevented, and the pressure in the domed chamber 16 rises to equal the pressure of the supplied gas, due to the continuous inflow of gas to the domed chamber through the metering orifice 14 in the resilient valve disc 13. The increased pressure in the domed chamber 16 urges the resilient valve disc 13 against the flange 11 on the inlet stem 7, thus closing the openings 12 in the flange and preventing gas from flowing to the outlet 10.

When the wearer inhales, the diaphragm 33 moves towards the body 1 under the influence of the ambient pressure on the outside of the diaphragm 33 and the force of biasing spring 36, thus tilting the lever to move the control projection 28 away from the jet 4. Gas can then escape from the domed chamber 16 through the jet 4, and the pressure in the domed chamber falls such that the valve disc will be urged away from the face of flange 11 by the pressure of the incoming gas, allowing a flow of gas through the openings 12 to the outlet and hence to the face-piece.

When the inhalation stops, the incoming gas to the face piece will inflate the face piece and urge diaphragm 33 away from face 2, thus closing the jet 4 and stopping the further supply of gas.

Exhalation by the wearer urges the diaphragm 33 further from face 2, keeping jet 4 and the gas supply closed. The facepiece exhaust valve vents exhaled air to atmosphere.

At the next inhalation, the reduction of pressure within the facepiece caused by the wearer's intake of breath again causes the jet 4 and demand valve to open, supplying more gas.

The outlet screens 19 and 20 serve to diffuse the flow of gas out of the valve and also to provide a pressure feedback via passage 23 to the space under the diaphragm.

For the valve to be accurately calibrated to close the openings 12 at a predetermined overpressure within the facepiece, the flow through the jet 4 has to be accurately controllable and predictable.

If the jet 4 is formed in the flat face 2 and is closed by a control projection 28 whose diameter is similar to that of the jet 4, then any eccentricity between the jet 4 and the projection 28 will provide a radial leakage path of low flow resistance as the projection 28 moves off the surface 2, and this will affect the rate of exit of gas from the jet 4 as the projection 28 moves away from the jet. Extreme accuracy in positioning the projection 28 concentrically over the jet 4 will therefore need to be achieved to provide a uniform response from one valve to the next, and this requires expensive machining of close tolerances to the components.

The present invention avoids expensive precision components by providing an annular recess surrounding the jet 4 to define a circular land area of known dimensions surrounding the jet 4. The control projection 28 of the lever 26 is arranged to be larger than this land area, and is positioned so as completely to cover the land area when urged onto the face 2 by the spring wire 29. The throttling effect produced as the jet is opened is thus repeatable in production valves, since the radial paths for the gas from the jet 4 between the projection 28 and the land area are all of the same length, even if the projection 28 extends beyond the land area by different amounts in different radial directions.

By making the area of projection 28 significantly larger than the land area surrounding the jet 4, accurate positioning of the projection 28 over the jet is not needed to ensure that the land area is completely covered by the projection 28.

Additionally, the land area surrounding the jet 4 is formed so as to be coplanar with the surfaces which support the projections 27 of the lever, so that movement of the control projection 28 in the initial stages of the movement of the lever 26 is a substantially perpendicular to the plane of the land area surrounding the jet 4. This "vertical lift" of the control projection 28 off the jet 4 produces a predictable and repeatable venting of the domed chamber 16 through the jet 4 as the lever 26 is tilted.

The face 2 of the body 1 is described above as being a planar surface. In order to achieve the advantages of the present invention, and to avoid excessive machining costs, the body 1 may be provided with a land area surrounding the jet 4 and bounded by a recess, and a further area coplanar with the land area for engagement of the projections 27 of the lever 26. This further area need not entirely surround the recess, and need not be contiguous with the recess, provided that the further area is coplanar with the land area. To ensure this coplanar relationship, the land area and the further area may be formed in a final lapping or other finishing operation on the valve body 1.

As an alternative to mounting the ends of the resilient wire form 29 in openings formed in the face 2, the spring wires may simply be clamped to the body by a screw clamp arrangement (not illustrated). In a further alternative, the resilient wire may be replaced by a leaf spring.

As an alternative to the two projections 27 intermediate the length of the lever which engage the face 2 of the body 1, the lever may comprise a single elongated ridge extending substantially tangentially to said control projection and spaced therefrom.

Figure 5:
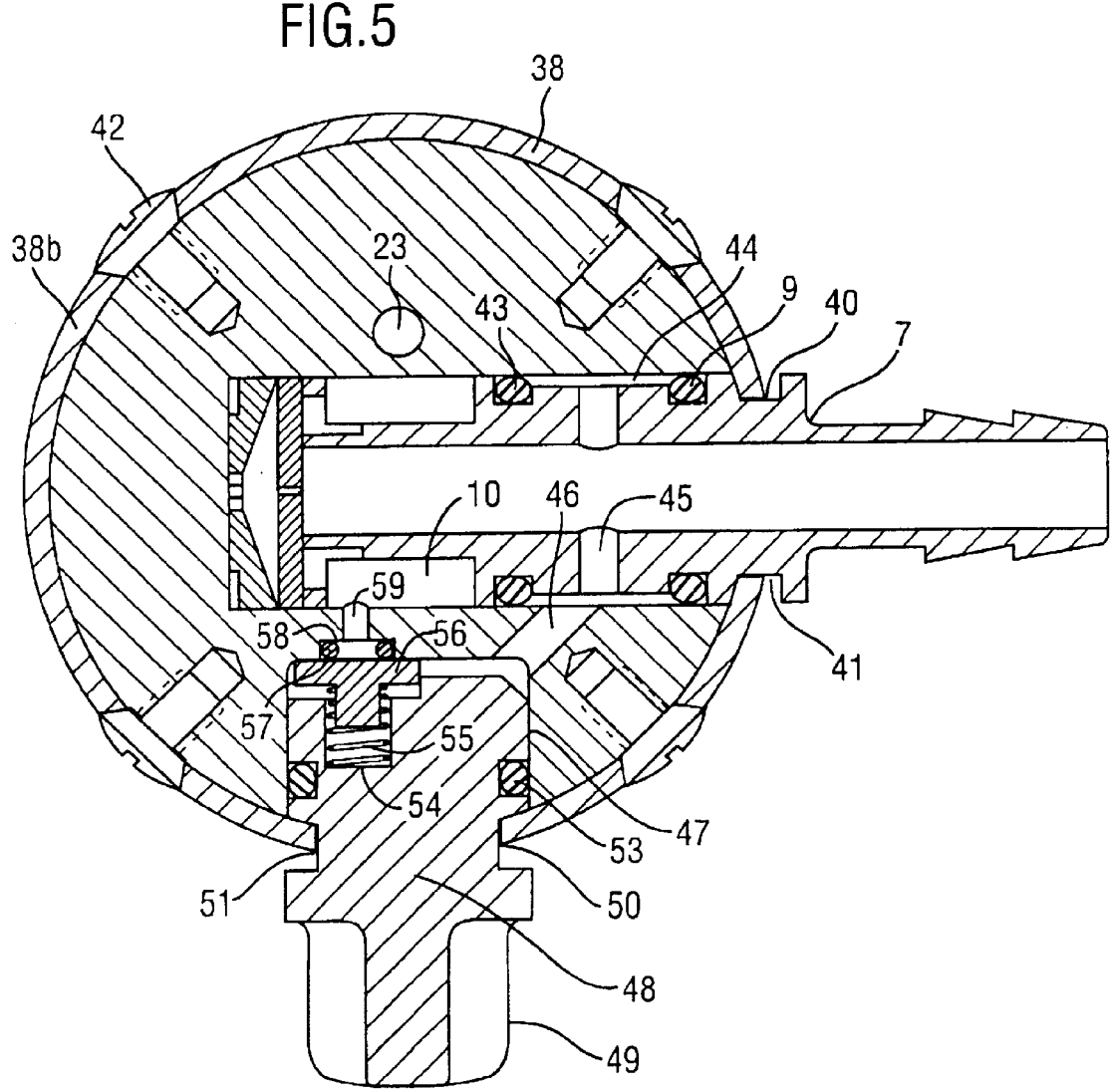
FIG. 5 shows a sectional view of the valve with a bypass valve included.

A second embodiment of a demand valve according to the invention incorporates a manually operated bypass valve and is here described with particular reference to FIGS. 5 and 6. In this valve, the inlet stem 7 is provided with a second annular seal 43 between the annular seal 9 and the annular space 10, the area between this second seal 43 and the first seal 9 having a reduced diameter so as to define an annular clearance 44 between the inlet stem 7 and the wall of the inlet bore 6. A cross hole 45 in the inlet stem 7 communicates between the annular clearance 44 and the axial bore of the inlet stem, to provide gas at supply pressure to the annular clearance 44.

A port 46 communicates between the annular clearance 44 and a second radial bore 47 in the body. The radially inner end of the second radial bore 47 communicates with the annular chamber 10 via a small port 59.

A cylindrical plug 48 terminating at its outer end in a knob 49, is retained in the radial bore 47 by a second arched cut-out 50 in the cover 38, which engages with a groove 51 around the plug. The base of this groove (seen in FIG. 6) is formed wit with two flats 51a and 51b, between which is a projection 52. The flats 51a and 51b abut respective side surfaces 50a and 50b of the arched cutout 50 in the cover, to limit rotation of the plug 48 to a quarter of a turn.

An annular seal 53 is housed in a groove around the plug 48, and seals the plug against the radial bore 47. An eccentric bore 54 in the inner end of the plug houses a spring 55 which bears upon a plunger 56, urging it against a resilient seal 57 housed in a recess 58 in the body and surrounding the small port 59.

Figure 6:
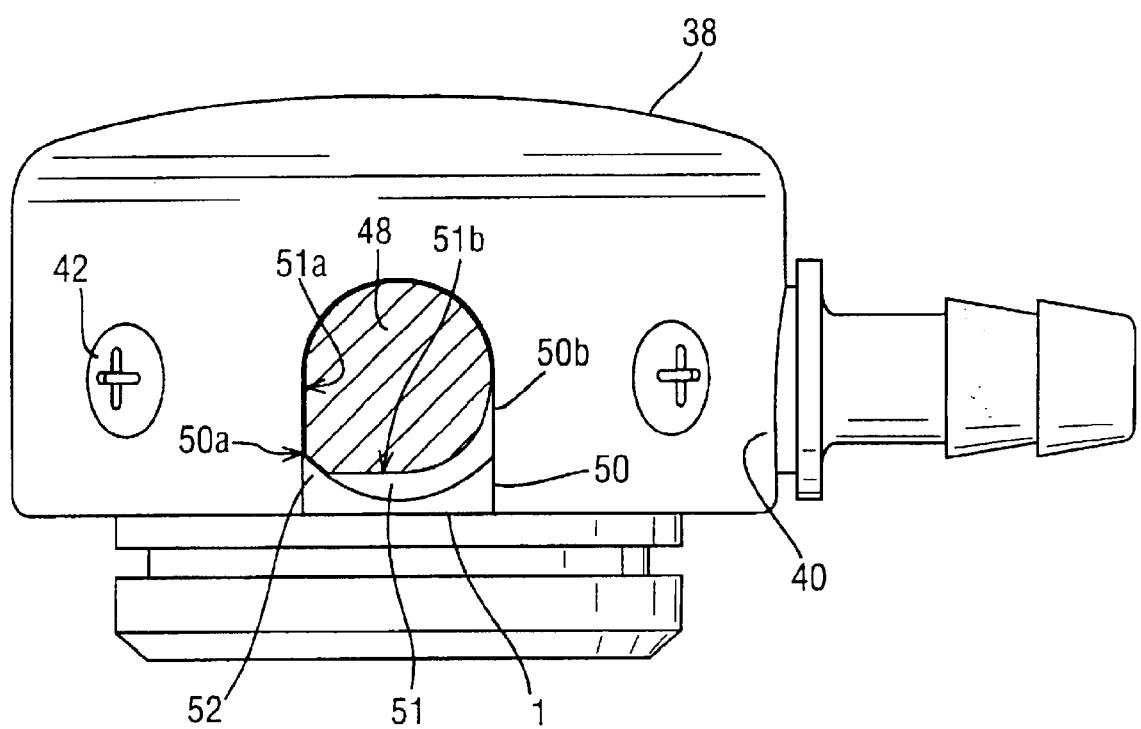
FIG. 6 shows a section of the bypass valve plug.

The bypass valve is shown in FIGS. 5 and 6 in its closed position, with flat 51a contacting side surface 50a of arched cut-out 50.

Gas under pressure passes from the axial bore of the inlet stem 7 through cross hole 45 to the area of annular clearance 44 between the stem 7 and the body 1, and thence through port 46 into the second radial bore 47. Its escape through small port 59 is prevented by contact between the spring loaded plunger 56 and resilient seal 57.

When the knob 49 is turned, rotating the plug 48 so that flat 51b contacts side surface 50b of arched cut-out 50, the plunger 56 sweeps across the seal 57, exposing the recess 58, allowing gas to pass through small port 59 to the valve outlet and hence to the face-piece. The rate of flow through the bypass valve is controlled by the size of the small port 59.

It will be appreciated that operation of the bypass valve does not affect, and is not affected by, the normal demand operation of the valve as previously described.

What is claimed is:

1. A pilot operated demand valve for supplying breathable gas from a gas supply to a breathing apparatus comprising a body having a connection adapted to be connected to a facepiece, hood or helmet of the breathing apparatus, main valve means responsive to pressure within a chamber in the body for selectively supplying gas from said gas supply to said connection, pilot valve means for regulating the exit of gas from the chamber, the pilot valve means comprising, a pilot jet having a predetermined jet area formed in a planar surface of the body, an operating lever having a projection with an area larger than the jet area, the lever pivotally engaging said surface along a line spaced from said jet for pivoting movement to and from a closed position in which the control projection overlies and closes the jet, and resilient spring means urging the lever toward the closed position.

2. A pilot operated demand valve according to claim 1 wherein the lever comprises first and second projections spaced from said control projection for engaging said planar surface.

3. A pilot operated demand valve according to claim 1 wherein the lever comprises an elongated ridge for engaging said planar surface, the ridge extending substantially tangentially to said control projection and spaced therefrom.

4. A pilot operated demand valve according to claim 1 wherein the resilient spring means comprises a spring of generally "U" shape having a central portion engageable with the lever and end portions mountable to said body.

5. A pilot operated demand valve according to claim 4 wherein the lever comprises a transverse groove to receive the central portion of the spring.

6. A pilot operated demand valve according to claim 5 wherein the groove has a central embossment on the longitudinal centerline of the lever to engage the central portion of the spring with point contact.

7. A pilot operated demand valve according to claim 1 wherein the pilot jet is surrounded by a land surface within a recess formed in said planar surface of the body, the land surface being level with said planar surface of the body.

8. A pilot operated demand valve according to claim 7 wherein the land surface and the control projection are circular in outline.

9. A pilot operated demand valve according to claim 7 wherein the area of the control projection is greater than the area of the land surface.

* * * * *